United States Patent Office 3,067,176
Patented Dec. 4, 1962

3,067,176
MELAMINE UREA FORMALDEHYDE RESINOUS
COMPOSITIONS
George Shiu Yim Poon, Charlotte, N.C., assignor to
Standard Chemical Products, Inc., Hoboken, N.J., a
corporation of New Jersey
No Drawing. Filed Mar. 13, 1959, Ser. No. 799,127
17 Claims. (Cl. 260—67.6)

This invention relates to certain aminoplast materials which are useful as crease-proofing agents and dimensional stabilizing agents. It also concerns the process for the preparation of the composition and to the process of treating fabrics (particularly cellulosic fabrics) with said crease-proofing agents and dimensional stabilizing agents.

Various suggestions have been made in the prior art for crease-proofing fabrics such as cellulose fabrics. However, these have suffered from various disadvantages. Thus, for example, certain prior art crease-proofing treatments of fabrics have resulted in products which retain an undue amount of chlorine causing damage to the fabrics. Furthermore, certain of these processes leave a heavy formaldehyde odor in the fabric. Moreover, it has been found that considerable discoloration takes place with the prior art crease-proofing products on scorching. Also, the crease-proofing effect of many of the prior art crease-proofing agents has left much to be desired.

It has now been found that crease-proofing agents, particularly for cellulosic fabrics, which do not have the disadvantages of the prior art products may be made by forming an intermediate by reacting a mixture of a urea, a triazine e.g. melamine and at least one aliphatic diamine. This intermediate is then further condensed with formaldehyde to give the desired crease-proofing agent. More particularly, the intermediate of the present aminoplast composition may be prepared by reacting one, two or more diamino-substituted saturated aliphatic hydrocarbon compounds e.g. alkylene diamines with a urea and a triazine e.g. melamine at elevated temperatures. The formaldehyde condensates of these intermediates impart excellent crease recovery and other desirable physical properties to treated cellulose fabric, e.g.:

(1) Little or no damage due to the retained chlorine after repeated sanforized washing.
(2) Relatively low in formaldehyde odor.
(3) No discoloration on scorching before or after being cloroxed.
(4) They impart a relatively high crease resistance to cellulosic materials.

As noted above in the preparation of the present intermediate products, at least one aliphatic diamine is employed. The diamine reactant may be a single diamine or a combination of two or three or more diamines. However, it is preferred to use at least two different diamines which may be diamines from the same families or different families.

A large variety of aliphatic amines and diamines and mixtures thereof may be used in accordance with the process of the present invention. Among these may be mentioned diethylene triamine; triethylene tetramine; ethylenediamine; 1,2-diaminopropane; trimethylenediamine; 1,2-butylenediamine; tetramethylenediamine; 2,3-diaminobutane; isobutylenediamine; pentamethylenediamine; 2-methyl-1, 2-diaminobutane; 2,2-dimethyl-1,3-propanediamine; hexamethylenediamine; tetraethyl-methylenediamine; decamethylenediamine, etc.

In a preferred form of this invention a combination of an aliphatic diamine of formula

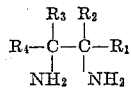

and

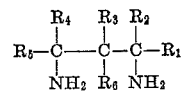

wherein $R_1$, $R_2$, $R_3$, $R_4$, $R_5$, or $R_6$ are hydrogen or alkyl (preferably lower alkyl) are employed.

A variety of triazine reactants may also be used in accordance with the present invention. By way of example may be mentioned triazines represented by the general formula:

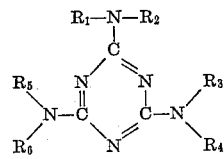

wherein $R_1$, $R_2$, $R_3$, $R_4$, $R_5$ or $R_6$ are hydrogen, or aliphatic group, particularly alkyl (preferably lower alkyl), and including hydroxyl alkyl, allyl, and amino groups. The optimum results are obtained with melamine i.e. the triazine wherein all the R's are hydrogen. Examples of the triazines that are useful for the present purposes are as follows:

2,4 diamino, 1,3,5-triazine (formoguanamine); melam; melem; melon or other products containing one or two amino groups supbstituted by hydroxy, halogen, alkyl such as 2-hydroxy-4,6-diamino 1,3,5-triazine (ammeline); 2-hydroxy-6-amino, 1,3,5-triazine (ammelide); 2-chloro-4, 6-diamino-1,3,5-triazine; 6-methyl-2, 4-diamino-1,3,5 triazine (acetoguanamine), N,N dimethyl melamine; N,N diethyl melamine; N,N dihydroxyethyl melamine; N,N diallyl-melamine.

The ureas that may be used in accordance with the present invention are quite varied and include the substituted and unsubstituted thioureas as well as the oxyureas. These may be expressed by the general formula

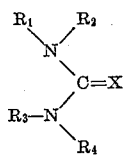

wherein X is O or S and $R_1$, $R_2$, $R_3$ and $R_4$ are hydrogen or organo groups e.g. alkyl and (preferably lower alkyl). The following are examples of ureas that may be used in accordance with the present invention: urea, thiourea, methylurea, ethylurea, sym-dimethylurea, unsym-dimethylurea, sym-diethylurea, unsym-diethylurea, n-butylurea, t - butylurea, n - ethylthiourea, n-t-butylthiourea. Optimum results are obtained with urea.

The reaction conditions employed in the present process will also vary with the particular reactants used and the results desired. In general, the reaction of the diamines, the urea and the triazine in the preparation of the intermediate is carried out in the temperature range of about 100° C. to 290° C. The formaldehyde condensation is preferably effected in the temperature range of about 40° C. to 100° C., or temperature at reflux. The condensation reaction with the formaldehyde solution is preferably carried out under slightly basic conditions.

The preparation of the intermediate reaction production of diamine, urea and triazine may be effected with or without the use of a separate liquidizing medium. Ethylene glycol serves as a suitable liquidizing medium for this reaction.

The proportions of the various reactants employed in the process will depend upon the particular results that are desired. By way of illustration for each mole or urea from 0.5 to 2 moles of the diamine reactant or reactants are employed and from 0.01 to 2 moles of triazine reactant are used.

The amount of formaldehyde can be varied from one to four moles for each mole of urea, and from 1 to six moles for each mole of triazine or melamine. It is most desirable to have two moles of formaldehyde per mole of urea, and two to four moles formaldehyde per mole of triazine or melamine.

The following examples are further illustrative of the present invention and it will be understood that the invention is not limited thereto.

*Example 1*

60.0 parts urea
52.6 parts 1,3 diaminopropane
17.7 parts 98% ethylenediamine
14.0 parts melamine The mixture was allowed to reflux in a round bottom flask until the temperature reached 270° C. At this point the product was a clear liquid which solidified on cooling. 189 parts of 37% aqueous formaldehyde was brought to a pH of 8.0–8.5 using sodium hydroxide solution. The formaldehyde was reacted with the solidified crystals at about 90° C. for about 1½ hours. The product was then cooled to room temperature. The pH was 7.9 and the yield was 277 parts.

*Example 2*

60.0 parts urea
55.5 parts 1,3 diaminopropane
15.3 parts ethylenediamine
20.0 parts melamine The process of Example 1 was repeated with the above mixture, however, a 200 parts of 37% aqueous formaldehyde was used instead of 189 parts. The yield was 299 parts.

*Example 3*

Cotton gingham samples were resin treated using 10% solution of each of the products of Examples 1 and 2 plus 1½% catalyst No. 100 (zinc nitrate solution buffered with an amine hydrochloride).

For comparison, samples were also treated with 10% modified melamine formaldehyde condensate by ethylene urea formaldehyde, 50% active, 1½% catalyst comprising zinc nitrate hexahydrate in water buffed with an aminehydrochloride, 40% active, and also 10% modified triazone formaldehyde condensate, approximately 60% active, plus 2% catalyst as specified. Samples were padded to about 70% wet pickup, air dried, after which cured at 330° F. for 70 seconds.

*Example 4*

60.0 parts urea
42.0 parts 1,3 diaminopropane
26.5 parts 98% ethylene diamine
18.3 parts melamine
30.0 parts ethylene glycol The mixture was allowed to reflux until the temperature reached 230° C. which took approximately four hours 15 minutes. 197 parts formalin (37% aqueous formaldehyde) was condensed with the above intermediate at 190° F. for one hour under slight alkaline conditions. The product was then cooled to room temperature, and the pH was brought to 8.0–8.5. The yield was 330 parts.

This example illustrates that ethylene glycol can be incorporated as a fluidizing agent. It offers, however, no significant advantage, since ethylene glycol would increase the cost and tends to introduce undesirable by-products, causing excessive discoloration, etc. to the final product.

Cotton gingham fabric was treated in the same manner as described in Example 3. The crease resistance of the treated fabric was excellent. The resistance to damage due to retained chlorine was good even after five sanforizing washes. (According to A.A.T.C.C. Standard Test Method 14–1953.)

*Example 5*

60 parts urea
48.9 parts 98% ethylene diamine
14.8 parts 1,3 diaminopropane
36 parts melamine The process of Example 1 was repeated with the above mixture, however, 255 parts Formalin (37% formaldehyde) was used instead of 189 parts. The yield was 368 parts.

The performance of the product on the treated fabric was good in crease resistance and low in damage due to retained chlorine.

INITIAL

|  | Monsanto Crease angle W. and F., wet | Trapezoid F. tear, lbs. | F. tensile, Lbs. |
|---|---|---|---|
| 1. Modified melamine formaldehyde condensate | 269 | 241 | 1.85 | 24.7 |
| 2. Modified triazone formaldehyde condensate | 278 | 235 | 1.80 | 25.6 |
| 3. Example 1 | 274 | 254 | 1.65 | 22.7 |
| 4. Example 2 | 285 | 250 | 1.75 | 23.9 |

AFTER 5 SANFORIZED WASHES

| 1. Modified melamine formaldehyde condensate | 221 | 241 | 2.3 | 28.7 |
|---|---|---|---|---|
| 2. Modified triazone formaldehyde condensate | 237 | 246 | 2.0 | 27.4 |
| 3. Example 1 | 234 | 212 | 2.15 | 28.7 |
| 4. Example 2 | 239 | 244 | 2.13 | 29.0 |

DAMAGE DUE TO RETAINED CHLORINE

|  | Percent loss in strength | |
|---|---|---|
|  | Initial [1] | After 5 sanforized washes [2] |
| 1. Modified melamine formaldehyde condensate | 0 | 41 |
| 2. Modified triazone formaldehyde condensate | 4 | 35 |
| 3. Example 1 | 3 | 0 |
| 4. Example 2 | 0 | 0 |

[1] AATCC Tentative Method 69–1952.
[2] AATCC Revised Method October 1, 1958.

REFLECTANCE

|  | After 1 mild wash | 60 secs. 365° Suter | 5 sanf. washes | A | B | C | D |
|---|---|---|---|---|---|---|---|
| 1. Modified melamine formaldehyde condensate | 82.0 | 80.2 | 77.5 | 82.3 | 80.2 | 79.7 | 79.3 |
| 2. Modified triazone formaldehyde condensate | 83.0 | 80.5 | 80.5 | 83.5 | 79.0 | 82.8 | 73.0 |
| 3. Example 1 | 82.5 | 81.2 | 80.5 | 83.7 | 82.1 | 80.3 | 81.3 |
| 4. Example 2 | 82.5 | 81.3 | 80.5 | 84.0 | 82.2 | 80.8 | 81.5 |

NOTE.—Reflectance—Photovolt reflectometer, blue filter. A. After cloroxing in AATCC Test of Damage Caused by Retained Chlorine. B. (A)—Scorched. C. After 5 sanforized washes then cloroxed. D. (C)—Scorched.

Cellulose fabric finished with the preparations from Examples 1 and 2 exhibits excellent crease resistance with no degradation due to retained chlorine even after 5 sanforized washes. The fabric remains white after scorching. There is relatively low formaldehyde odor on the unwashed treated fabric.

As noted above, the ratio of the reactants can be varied within a wide range. The selection of the proper ratio is further complicated by the presence of three or more reactants. Keeping urea in unit molar quantity, the proper balance of the diamines and melamine can be established to achieve the performance required. With the increase in melamine there is a decrease in formaldehyde odor which is again dependent on the amount of formaldehyde introduced. It is, as a general rule, that the minimum amount of 1,3 diaminopropane with the maximum amount of ethylenediamine and melamine should be used without sacrificing chlorine retention and discoloration due to scorching and chlorine bleaching.

While the invention has been described with particular reference to specific embodiments, it is to be understood that it is not limited thereto but is to be construed broadly and restricted solely by the scope of the appended claims. For instance, additives such as softeners, stiffening agents, latices, water repellants and any other additives known to the textile art can be incorporated with the resin solution. Other catalysts which are used for catalyzing similar thermosetting agents can also be used. Examples are organic or inorganic acids, amine hydrochlorides, magnesium chloride, zinc chloride, ammonium chloride, pyridine nitrate, quaternary ammonium salts, etc.

Furthermore, the ratio of two diamines can be varied from zero to infinity, and a single diamine can be used instead of two in all of the examples.

What is claimed is:

1. A composition of matter useful as an intermediate in the preparation of a crease-proofing agent produced by heating at temperatures of about 100° C. to 290° C. a mixture of the following reactants: (1) a urea having the formula

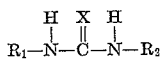

wherein $R_1$ and $R_2$ are selected from the group consisting of hydrogen and alkyl and X is selected from the group consisting of oxygen and sulfur (2) 0.01 to 2.0 moles per mole of said urea of a triazine having the formula

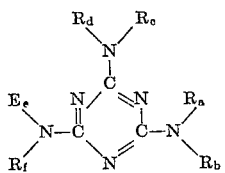

wherein $R_a$, $R_b$, $R_c$, $R_d$, $R_e$ and $R_f$ are selected from the group consisting of hydrogen and alkyl and (3) 0.5 to 2.0 moles per mole of said urea of an aliphatic diamine selected from the group consisting of

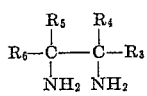

and

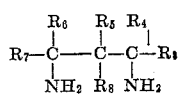

and mixtures thereof wherein $R_3$, $R_4$, $R_5$, $R_6$, $R_7$ and $R_8$ are selected from the group consisting of hydrogen, hydroxy alkyl, alkyl, amino and allyl, said reactants being the sole reactants.

2. A process for the preparation of a crease-proofing composition which comprises heating at temperatures of about 100° C. to 290° C. a mixture of the following reactants: (1) a urea having the formula

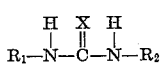

wherein $R_1$ and $R_2$ are selected from the group consisting of hydrogen and alkyl and X is selected from the group consisting of oxygen and sulfur (2) 0.01 to 2.0 moles per mole of said urea of a triazine having the formula

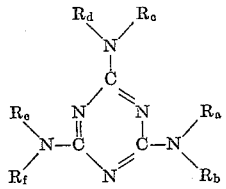

wherein $R_a$, $R_b$, $R_c$, $R_d$, $R_e$ and $R_f$ are selected from the group consisting of hydrogen and alkyl and (3) 0.5 to 2.0 moles per mole of said urea of an aliphatic diamine selected from the groups consisting of

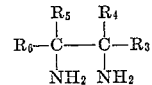

and

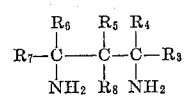

and mixtures thereof wherein $R_3$, $R_4$, $R_5$, $R_6$, $R_7$ and $R_8$ are selected from the group consisting of hydrogen, hydroxy alkyl, alkyl, amino and allyl, said reactants being the sole reactants, to form an intermediate reaction product, subsequently reacting the said reaction product with formaldehyde at temperatures from about 40° C. to about 100° C. to form said crease-proofing composition and recovering said composition.

3. The process of claim 2 wherein about 1 mole of the aliphatic diamine is present for each mole of the urea.

4. The product produced by the process of claim 2.

5. A process according to claim 2 wherein a mixture of 1,3 diaminopropane, ethylenediamine, urea and melamine are reacted to form said intermediate reaction product.

6. The product made by the process of claim 5.

7. As an article of manufacture a fabric treated with the composition of claim 2.

8. A process according to claim 2 wherein a mixture of 1,3 diaminopropane, triethylene tetramine, urea and melamine are reacted to form said intermediate reaction product.

9. A process according to claim 2 wherein a mixture of 1,3 diaminopropane, diethylene triamine, urea and melamine are reacted to form said intermediate reaction product.

10. A process according to claim 2 wherein a mixture of 1,3 diaminopropanol, ethylenediamine, urea and melamine are reacted to form said intermediate reaction product.

11. A process according to claim 2 wherein a mixture of 1,3 diaminopropanol, triethylene tetramine, urea and melamine are reacted to form said intermediate reaction product.

12. A process according to claim 2 wherein a mixture of 1,3 diaminopropanol, diethylene triamine, urea and melamine are reacted to form said intermediate reaction product.

13. The product made by the process of claim 8.
14. The product made by the process of claim 9.
15. The product made by the process of claim 10.
16. The product made by the process of claim 11.
17. The product made by the process of claim 12.

References Cited in the file of this patent

UNITED STATES PATENTS

| | | |
|---|---|---|
| 2,197,357 | Widmer et al. | Apr. 16, 1940 |
| 2,377,867 | D'Alelio | June 12, 1945 |
| 2,388,235 | Bowman et al. | Nov. 6, 1945 |
| 2,545,049 | Schaefer et al. | Mar. 13, 1951 |
| 2,729,611 | Chesley et al. | Jan. 3, 1956 |

UNITED STATES PATENT OFFICE
CERTIFICATE OF CORRECTION

Patent No. 3,067,176                      December 4, 1962

George Shiu Yim Poon

It is hereby certified that error appears in the above numbered patent requiring correction and that the said Letters Patent should read as corrected below.

Column 4, first table, second column, line 2 thereof, for "278" read -- 258 --; column 5, lines 38 to 45, for the left hand portion of the formula reading

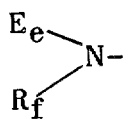      read      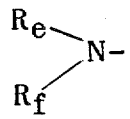

Signed and sealed this 23rd day of July 1963.

(SEAL)
Attest:

ERNEST W. SWIDER
Attesting Officer

DAVID L. LADD
Commissioner of Patents